(12) United States Patent
Saito et al.

(10) Patent No.: US 7,998,333 B1
(45) Date of Patent: Aug. 16, 2011

(54) METHOD OF MANUFACTURING A MAGNETIC RECODING MEDIUM

(75) Inventors: Tatsuya Saito, Kawasaki (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/093,792

(22) Filed: Apr. 25, 2011

Related U.S. Application Data

(62) Division of application No. 11/851,648, filed on Sep. 7, 2007.

(30) Foreign Application Priority Data

| Sep. 21, 2006 | (JP) | ................................. 2006-256319 |
| Jan. 12, 2007 | (JP) | ................................. 2007-004971 |
| Jul. 4, 2007  | (JP) | ................................. 2007-176692 |

(51) Int. Cl.
 *C25D 11/02* (2006.01)
 *C23C 28/00* (2006.01)

(52) U.S. Cl. ........ 205/175; 205/171; 205/174; 205/188; 205/201; 205/223; 205/224; 205/229

(58) Field of Classification Search ................. 205/171, 205/174, 175, 201, 223, 224
See application file for complete search history.

(56) References Cited

U.S. PATENT DOCUMENTS

| 4,548,682 | A  | * | 10/1985 | Yoshida et al. | ............... 205/119 |
| 5,372,843 | A  |   | 12/1994 | Miyamura et al. | |
| 6,579,634 | B2 |   | 6/2003  | Saito | |
| 6,791,797 | B2 | * | 9/2004  | Saito et al. | .................... 360/136 |
| 6,947,235 | B2 |   | 9/2005  | Albrecht et al. | |
| 6,982,217 | B2 | * | 1/2006  | Imada et al. | .................. 438/584 |
| 7,067,207 | B2 |   | 6/2006  | Kamata et al. | |
| 7,384,792 | B1 | * | 6/2008  | Wang et al. | .................... 436/165 |
| 7,635,529 | B2 |   | 12/2009 | Naito et al. | |
| 7,732,071 | B2 |   | 6/2010  | Fullerton et al. | |
| 7,771,791 | B2 |   | 8/2010  | Ueda et al. | |
| 7,794,861 | B2 |   | 9/2010  | Saito et al. | |
| 7,901,737 | B2 |   | 3/2011  | Yasui et al. | |
| 2007/0026265 | A1 | | 2/2007 | Sakurai et al. | |
| 2008/0085425 | A1 | | 4/2008 | Girt et al. | |
| 2008/0292907 | A1 | | 11/2008 | Berger et al. | |
| 2009/0004509 | A1 | | 1/2009 | Benakli et al. | |

* cited by examiner

*Primary Examiner* — Alexa Neckel
*Assistant Examiner* — William Leader
(74) *Attorney, Agent, or Firm* — Fitzpatrick, Cella, Harper & Scinto

(57) ABSTRACT

The present invention provides a method of manufacturing a magnetic recording medium having high recording density. The magnetic recording medium manufacturing method of the present invention is directed to a manufacturing method including: disposing at least a silicon layer on a substrate; disposing an uneven structure including regularly arranged projections on the silicon layer; disposing magnetic material on the upper surfaces of the projections and within recessed parts of the uneven structure; and allowing the magnetic material disposed within each recessed part to be changed into silicon compound by heat treatment.

3 Claims, 8 Drawing Sheets

METHOD OF MANUFACTURING A MAGNETIC RECODING MEDIUM

This application is a divisional of application Ser. No. 11/851,648, filed Sep. 7, 2007, the contents of which are incorporated herein by reference.

BACKGROUND OF THE INVENTION

1. Field of the Invention

The present invention relates to a magnetic recording medium utilized as an information recording medium, and a method of manufacturing the same.

2. Description of the Related Art

With recent rapid increase in information processing quantity, realization of large increase in capacity is required in magnetic recording media widely used as an information recording medium. Particularly, in hard discs, large increase in capacity and large increase in recording density have been realized until now with development of fine processing technology and signal processing technology, etc. being supported. However, nowadays, recording density is becoming close to about 200 Gbits/in$^2$ which has been considered to be physical limit resulting from the problem of thermal fluctuation in the conventional in-plane recording system in which magnetization is recorded in a substrate in-plane direction, and increasing speed of the recording density becomes gentle. In recent years, hard discs of the system of recording magnetization in a substrate perpendicular direction, which is the so-called perpendicular recording system, which have been considered to be tolerable to the problem of the thermal fluctuation have been realized as products. From this fact, it is expected that further improvement in the recording density will be realized also in future.

However, with respect to realization of higher density in future, increase in noise becomes a great problem. Namely, there is the problem that unevennesses of shape and size of magnetic particle constitute cause of noise with miniaturization of recording bits based on realization of high recording density to deteriorate the recording/reproducing characteristic. To solve this problem, it is considered that reduction in exchange interaction between adjacent magnetic particles, and miniaturization of size of magnetic particle or realization of uniform shape are effective. Specifically, there are mentioned a method of adding SiO$_2$ into CoCrPt based material to surround magnetic particle by non-magnetic material to separate the magnetic particle, and a method of reducing mean diameter of particles with respect to the recording direction.

Moreover, there is also known a method of controlling shape and size of magnetic particle by making use of the fine processing technology to thereby allow them to be uniform. Particularly, a medium in which control is performed to the extent of arrangement of magnetic particles is performed so that magnetic particles which are uniform in shape and size are regularly arranged is called a patterned medium. Thus, an ultra-high density recording medium having the recording density of the order of 1T bits/in$^2$ can be realized.

To prepare such a patterned medium, there is mentioned a method of implementing processing such as etching, etc. to magnetic layer to prepare regularly arranged magnetic particles which are uniform in shape and size.

Moreover, in order to lessen damage to the magnetic layer due to physical processing such as etching, etc., there is also a method of chemically alter a part of the magnetic layer. Namely, there is proposed a method in which mask is provided on the magnetic layer surface to halogenate the exposed magnetic layer to thereby allow the exposed magnetic layer parts to be locally non-magnetized.

Further, there is also known a method of preparing an uneven structure in which projections are regularly arranged in advance thereafter to form films of magnetic material to allow the magnetic material parts formed as film on the upper surface of the projections to be as recording part.

However, in the conventional method of allowing the magnetic layer parts to be locally non-magnetized by a chemical process, it is difficult to obtain sufficient processing accuracy because the size of magnetic particles regularly arranged becomes small according as the recording density of patterned medium becomes high.

In addition, in the method of allowing the magnetic material formed as film on the upper surface of the projection to be recording part, magnetic material is formed as film also between each recessed part between projections so that magnetic coupling takes place between the magnetic material within the recessed part and the magnetic material on the upper surface of the projection. For this reason, it is a task to completely separate such magnetic coupling.

SUMMARY OF THE INVENTION

The present invention provides a magnetic recording medium having high recording density and a method of manufacturing the same.

The present invention is directed to a magnetic recording medium including an uneven structure comprising regularly arranged projections disposed on a substrate; hard magnetic materials disposed on upper surfaces of the projections of the uneven structure; an underlying layer disposed within each of recessed parts of the uneven structure; and a non-magnetic material or a soft-magnetic material containing at least compound of the underlying layer disposed on the underlying layer.

The underlying layer can be silicon layer, germanium layer, aluminum layer or magnesium layer.

In the magnetic recording medium, a second underlying layer can be at least further disposed on the substrate.

The present invention is directed to a magnetic recording medium including: an underlying layer disposed on a substrate; an uneven structure comprising regularly arranged projections disposed on the underlying layer; hard magnetic materials disposed on upper surfaces of the projections of the uneven structure; a non-magnetic material or a soft-magnetic material containing at least compound of the underlying layer disposed within each of recessed parts of the uneven structure.

The underlying layer can be silicon layer, germanium layer, aluminum layer or magnesium layer.

In the magnetic recording medium, a second underlying layer can be at least further disposed on the underlying layer.

The present invention is directed to a method of manufacturing a magnetic recording medium, comprising the steps of: disposing, on a substrate, an uneven structure comprising regularly arranged projections; disposing an underlying layer within each of recessed parts of the uneven structure; disposing a magnetic material on each of the upper surfaces of the projections and within each of the recessed parts of the uneven structure; and allowing the magnetic material disposed within each of the recessed parts to be changed into compound which contains the material of the underlying layer by heat treatment.

The disposing of the underlying layer can comprises disposing silicon layer, germanium layer, aluminum layer or magnesium layer.

The disposing step of the uneven structure can comprises the steps of: disposing a second underlying layer on the substrate to further dispose an layer to be anodized on the second underlying layer; allowing the layer to be anodized to be changed into porous film having regularly arranged holes by anodization; growing oxide of the second underlying layer within holes of the porous film in a manner perpendicular, to the substrate; and removing the porous film to obtain an uneven structure by projections including oxides of the second underlying layer, which have been regularly arranged on the second underlying layer.

The growing of the oxide of the second underlying layer in a manner perpendicular to the substrate can comprises performing anodization of the second underlying layer. Electrolytic solution used in implementing anodization to the second underlying layer can be aqueous solution of ammonium borate, ammonium tartrate, or ammonium citrate. The method of manufacturing the magnetic recording medium can include disposing an orientation layer and a magnetic material on each of the upper surfaces of the projections and within each of the recessed parts of the uneven structure.

The present invention is directed to a method of manufacturing a magnetic recording medium, comprising the steps of: disposing at least an underlying layer on a substrate; disposing an uneven structure comprising regularly arranged projections on the underlying layer; disposing a magnetic material on each of the upper surfaces of the projections and within each of recessed parts of the uneven structure; and allowing the magnetic material disposed within each of the recessed parts to be changed into compound which contains the material of the underlying layer by heat treatment.

The disposing of the underlying layer can comprise disposing silicon layer, germanium layer, aluminum layer or magnesium layer.

The disposing step of the uneven structure can comprise the steps of: disposing at least an underlying layer on a substrate and further disposing a second underlying layer on the underlying layer to further dispose an layer to be anodized on the second underlying layer; allowing the layer to be anodized to be changed into a porous film having regularly arranged holes by anodization; growing the oxide of the second underlying layer within the holes of the porous film in a manner perpendicular to the substrate; and removing the porous film to obtain an uneven structure by projections each including the oxide material of the second underlying layer, which have been regularly arranged on the second underlying layer.

The growing of the oxide of the second underlying layer in a manner perpendicular to the substrate can comprise performing anodization of the second underlying layer. In the method of manufacturing magnetic recording medium, electrolytic solution used in performing anodization of the second underlying layer is an aqueous solution of ammonium borate, ammonium tartrate air ammonium citrate. The method of manufacturing the magnetic recording medium can include disposing an orientation layer and a magnetic material on each of the upper surfaces of the projections and within each of the recessed parts of the uneven structure.

In accordance with the present invention, only magnetic material of each recessed portion of the uneven structure is permitted to be locally non-magnetized or soft-magnetized by heat treatment. Accordingly, it is possible to separate magnetic coupling between the magnetic material formed within the recessed part between projections and the magnetic material on the upper surface of the projection. Thus, it is possible to provide a magnetic recording medium having high recording density.

Further features of the present invention will become apparent from the following description of exemplary embodiments with reference to the attached drawings.

DESCRIPTION OF THE EMBODIMENTS

Figure 1:
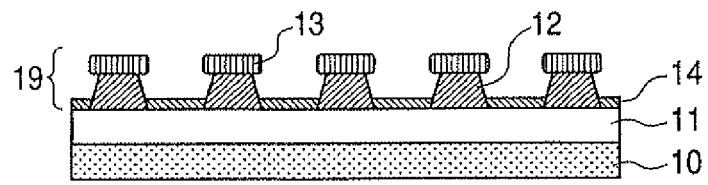
FIG. 1 is a cross sectional view showing an exemplary embodiment of a magnetic recording medium of the present invention.

FIG. 1 is a cross sectional view showing an exemplary embodiment of a magnetic recording medium of the present invention. In FIG. 1, a silicon layer 11 serving as an underlying layer is disposed on a substrate 10. There is provided an uneven structure 19 in which projections 12 are regularly disposed. Further, hard magnetic materials 13 serving as a recording part are disposed on the upper surfaces of the projections 12, and non-magnetic materials 14 containing silicon serving as an underlying layer are disposed within the parts serving as recessed parts of the uneven structure.

The process steps for manufacturing the magnetic recording medium shown in FIG. 1 will now be described in detail in order in accordance with FIGS. 2A to 2D.

FIGS. 2A to 2D are process diagrams showing the exemplary embodiment of a method of manufacturing the magnetic recording medium of the present invention. First, the silicon layer 11 serving as the underlying layer is disposed on the substrate 10, and an oxide layer 15 is further disposed on the underlying layer (see FIG. 2A). It is to be noted that glass or silicon, etc. is used as the substrate 10, and $SiO_2$, etc. is used as the oxide layer 15, but materials used are not particularly limited to these materials.

Next, the oxide layer 15 is processed by using process such as dry etching, etc. so that there is provided an uneven structure 19 including projections 12 regularly arranged (see FIG.

2B). Etching pattern of dry etching may be formed by conventional typical methods such as resist patterning based on light or electron beam, or patterning utilizing nano in-print, etc.

Subsequently, a magnetic layer serving as a recording part is formed as film. In this instance, since the magnetic layers are disposed in a manner reflecting arrangement of projections, film formation of the upper parts and the recessed parts of the projections is performed so that the recessed parts of the uneven structure are not clogged by magnetic material 16 (see FIG. 2C). To realize this, it is desirable to form film with directivity so that incident direction of film formation particles is perpendicular to the substrate. Specifically, in the case of sputtering, lowering gas pressure at the time of sputtering, elongation of distance between the target and the sample, and disposing of collimator between the target and the sample, etc. are effective in order to improve directivity of sputter particles flying onto the sample. In accordance with these methods, attachment of film onto the side wall of projection is suppressed. Thus, the magnetic materials 16 disposed on the upper surfaces of the projection are disposed in a manner reflecting arrangement of projections. Moreover, since sputter particles are flied with directivity in a direction perpendicular to the substrate, magnetic material 11 is somewhat disposed within each recessed part although attachment of film onto the side wall of projection is suppressed. The magnetic material may be selected from materials having large crystal magnetic anisotropy typically used as a recording medium. Moreover, in order to realize the perpendicular recording system, there may be selected material having uniaxial magnetic anisotropy in a direction perpendicular to the film surface. For example, material may be selected from multi-layered film [Co/M] (M=Pt, Pd), Co or $Co_3Pt$ of hcp (hexagonal closest packing lattice) structure in which the c-axis is oriented in a direction perpendicular to the substrate, M'Pt or M'Pd (M'=Co, Fe) of the $L1_0$ ordered structure, etc. Moreover, in the case where crystal orientation of the magnetic material needs to be controlled such as Co or $Co_3Pt$, M'Pt or M'Pd (M'=Co, Fe), an underlying layer aiming at orientation control, which is called an orientation layer in the present invention, may be disposed as occasion demands between the upper part of the projection and the magnetic material.

Figure 2A:
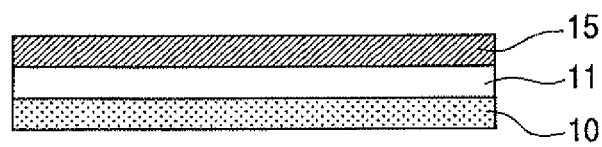
FIGS. 2A, 2B, 2C and 2D are process diagrams showing an exemplary embodiment of a method of manufacturing the magnetic recording medium of the present invention.
Figure 2B:
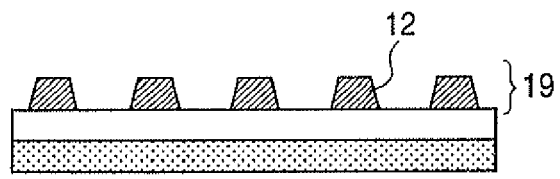
Figure 2C:
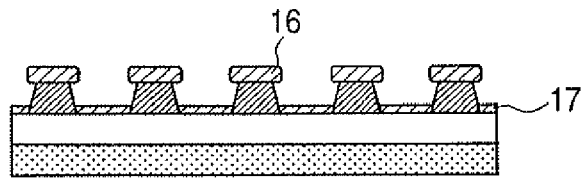
Figure 2D:
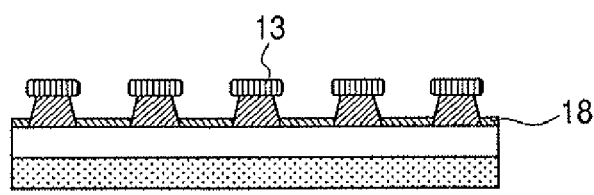

Next, the sample where the magnetic material is disposed is caused to undergo thermal treatment to thereby allow the magnetic material 17 disposed within the recessed part to be changed into silicon compound to allow it to be non-magnetized or soft-magnetized (see FIG. 2D). Namely, silicon is diffused from the silicon layer 11 to the magnetic material 17 by heat treatment to thereby change the composition of the magnetic material 17 into intermetallic compound (silicide) 18 between the magnetic material and silicon. As a silicide formation temperature, Fe is 450° C. to 500° C., Pt is 200° C. to 500° C., Co is 350° C. to 550° C., and Pd is 100° C. to 850° C., etc. The silicide formation temperature changes depending upon element.

On the other hand, for the magnetic material disposed on the upper surface of the projection, there is no diffusion from the silicon layer 11 so that change of composition does not take place. For this reason, in the case where the magnetic material. 16 is hard magnetic material, the magnetic material 16 holds hard magnetism even after heat treatment. Moreover, in the case of magnetic material such as M'Pt or M'Pd (M'=Co, Fe), the magnetic material changes from the disordered structure of fcc (face-centered cubic lattice) to the $L1_0$ ordered structure by heat treatment more than the ordering temperature. Thus, the magnetic material 16 disposed on the upper surface of the projection changes from soft magnetic material 16 to hard magnetic material 13.

Namely, by applying heat having ordering temperature of the magnetic material and more than the silicide formation temperature, the structure in which hard magnetic materials 13 serving as the recording parts are regularly arranged on the upper surfaces of the projections and the silicide 18 is disposed within each recessed part between projections can be prepared.

In the case where hard magnetic materials are disposed both on the upper surface of the projection and within the recessed part, magnetic coupling is produced between these magnetic materials. For this reason, it is necessary for separating the magnetic coupling to take height of the projection to same extent. However, in the structure according to the present invention, since magnetic material disposed within the recessed part between projections is changed into silicide by heat treatment so that it is non-magnetized or soft-magnetized, it becomes possible to easily separate the magnetic coupling irrespective of the height of the projection.

It is to be noted that while oxide is employed as material for forming the projection in this example, there may be employed any material which does not form compound with the magnetic material disposed on the upper surface of the projection by the above-mentioned heat treatment, and material used is not particularly limited to oxide.

Moreover, in the case where silicon substrate is used, since diffusion of silicon takes place from the silicon substrate so that the substrate itself performs the role of the silicon layer 11 serving as underlying layer, similar effect can be obtained even if the silicon layer 11 is not disposed.

Further, also in the case where germanium layer, aluminum layer or magnesium layer is utilized as the underlying layer, since magnetic material disposed within the recessed part between projections results in non-magnetized or soft-magnetized compound by heat treatment, similar advantages can be obtained. It is to be noted that, in the present invention, the underlying layer refers to a layer for allowing magnetic material to be non-magnetized or soft-magnetized in this way.

In addition, the uneven structure having the regularly arranged projections may be also formed by anodization in a manner described below. FIGS. 7A to 7D are process diagrams showing a modified exemplary embodiment of a method of manufacturing uneven structure by anodization.

Figure 7A:
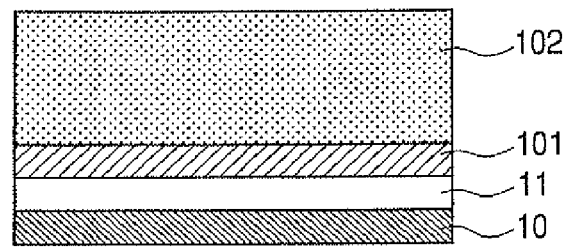
FIGS. 7A, 7B, 7C and 7D are process diagrams showing a modified exemplary embodiment of a method of manufacturing uneven structure by the anodization.
Figure 7B:
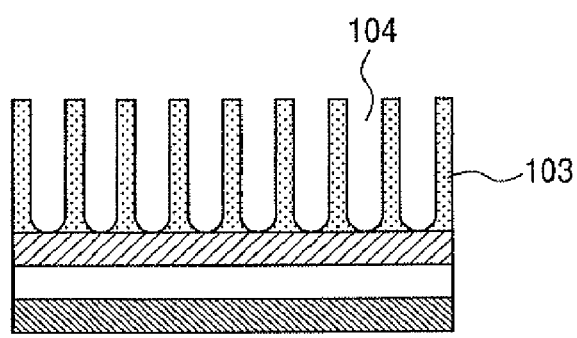
Figure 7C:
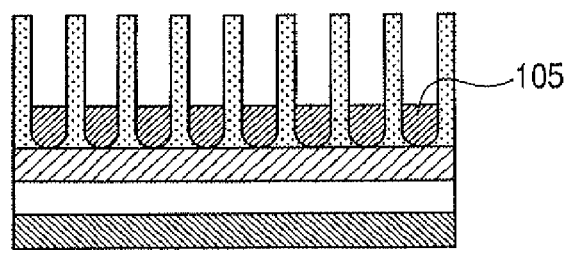
Figure 7D:
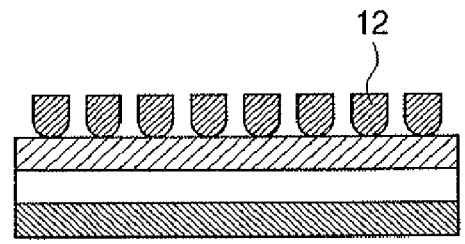

First, silicon layer 11 as underlying layer is disposed on substrate 10, a second underlying layer 101 is further disposed on the silicon layer 11, and a layer to be anodized 102 is further disposed on the second underlying layer (see FIG. 7A). Subsequently, the layer to be anodized 102 is caused to undergo anodization in electrolytic solution such as phosphorous acid, oxalic acid, sulfuric acid, etc. to allow the layer to be anodized 102 to be a porous film 103 (see FIG. 7B). In this instance, in order to regularly arrange holes 104 of the porous film, recessed parts serving as the starting point of anodization may be regularly disposed on the surface of the layer to be anodized 102 before anodization. As the layer to be anodized 102, Al or alloy containing Al as main component may be utilized.

Further, the electrolytic solution is changed into ammonium borate, ammonium tartrate, ammonium citrate, etc. to perform anodization. Thus, the second underlying layer 101 in changed into oxide so that volume expansion is performed. From this fact, the oxide 105 of the second underlying layer grows in such a manner that the oxide is filled within holes 104 of the porous film (see FIG. 7C). In order to grow the oxide 105 of the second underlying layer in this way, it is sufficient to allow material containing at least one element selected from Ti, Zr, Hf, Nb, Ta, Mo, W to be second underlying layer 101. It should be noted that, in the present invention, the second underlying layer refers to such a layer filled within holes of porous film as the result of the tact that volume expansion is performed.

Finally, the sample is immersed into acid or alkali to selectively remove, by wet etching, only the porous film 103 part. Thus, there is obtained an uneven structure including projections 12 including oxide of the second underlying layer, which corresponds to the arrangement of holes 104 of the porous film (see FIG. 7D).

When heat treatment is performed after magnetic material is disposed by a technique similar to above, silicon is diffused from the silicon layer 11 so that the second underlying layer 101 results in silicide. Further, the magnetic material disposed within the recessed part between projections 12 also changes into silicide because silicon is diffused from the second underlying layer 101 changed into silicide. Thus, it is non-magnetized or soft-magnetized and it becomes possible to separate magnetic coupling between the magnetic material disposed within the recessed part and the magnetic material on the upper surface of the projection 12.

Another exemplary embodiment of the present invention will now be described.

Figure 8:
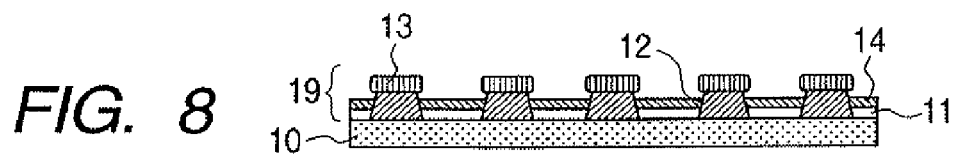
FIG. 8 is a cross sectional view showing another exemplary embodiment of the magnetic recording medium of the present invention.

FIG. 8 is a cross sectional view showing another exemplary embodiment of the magnetic recording medium of the present invention. In FIG. 8, there is provided an uneven structure 19 in which projections 12 are regularly disposed on the substrate 10. Further, hard magnetic materials 13 serving as the recording part are disposed on the upper surfaces of the projections 12, and silicon layer 11 serving as underlying layer and non-magnetic material 14 containing silicon compound are disposed within the part serving as each recessed part of the uneven structure.

The process steps for manufacturing the magnetic recording medium shown in FIG. 8 will now be described in detail in order in accordance with FIGS. 9A to 9E.

FIGS. 9A to 9F are process diagrams showing another exemplary embodiment of the method of manufacturing magnetic recording medium of the present invention. First, an oxide layer 15 is disposed on the substrate 10 (see FIG. 9A).

Figure 9A:
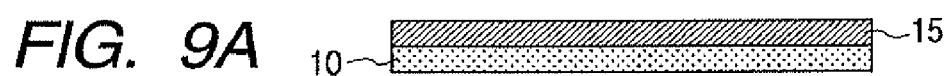
FIGS. 9A, 9B, 9C, 9D, 9E and 9F are process diagrams showing another exemplary embodiment of a method of manufacturing the magnetic recording medium of the present invention.
Figure 9B:

Next, the oxide layer 15 is processed by using a method such as dry etching so that there is provided the uneven structure 19 having projections 12 regularly arranged (see FIG. 9B).

Figure 9C:

Subsequently, film of silicon is formed to dispose the silicon layer 11 serving as underlying layer with respect to the upper surfaces and the recessed parts of the projection (see FIG. 9C).

Figure 9D:
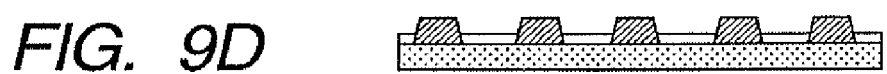

Next, surface polishing using diamond slurry, etc. is performed to thereby remove only silicon layer 11 parts disposed on the upper surfaces of the projections (see FIG. 9D). Moreover, in the case where the projection is fallen by surface polishing, resin such as PDMS, etc. may be coated to fill recessed parts thereafter to perform surface polishing. After polishing is completed, resin is removed by acetone, etc.

Figure 9E:

Subsequently, magnetic film is formed to thereby dispose the magnetic materials 16 on the upper surfaces of the projections and to dispose magnetic materials 17 on the silicon layer 11 within the recessed parts (the parts on the underlying layer) (see FIG. 9E).

Figure 9F:
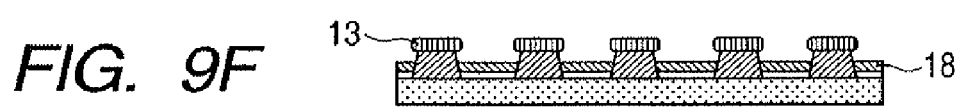

Next, the sample where the magnetic materials are disposed is caused to undergo heat treatment to thereby allow the magnetic material 17 disposed within each recessed part to be silicide 16 to allow it to be non-magnetized or soft-magnetized (see FIG. 9F).

On the other hand, for the magnetic material 16 disposed on the upper surface of the projection, there is no diffusion from the silicon layer 11 so that no change of composition takes place. For this reason, in the case where the magnetic material 16 is hard magnetic material 13, the magnetic material holds hard magnetism even after heat treatment.

Moreover, the uneven structure having the regularly arranged projections may be formed by anodization in a manner as described below. FIGS. 11A to 11D are process diagrams showing a further modified exemplary embodiment of a method of manufacturing uneven structure by anodization.

Figure 11A:
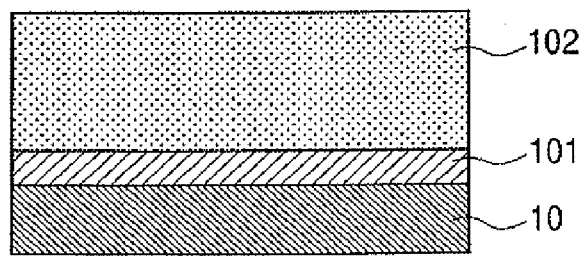
FIGS. 11A, 11B, 11C and 11D are process diagrams showing a further modified exemplary embodiment of a method of manufacturing uneven structure by anodization.

First, a second underlying layer 101 is disposed on the substrate 10, and an layer to be anodized 102 is further disposed on the second underlying layer (see FIG. 11A).

Figure 11B:
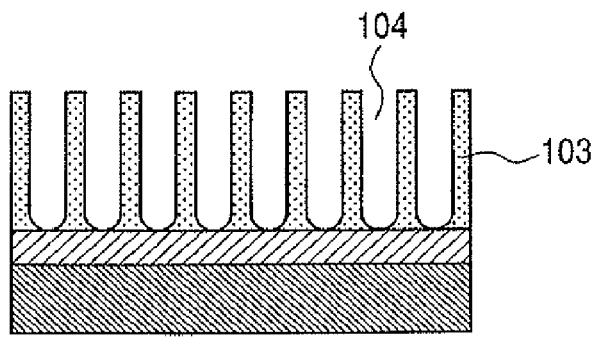
Figure 11C:
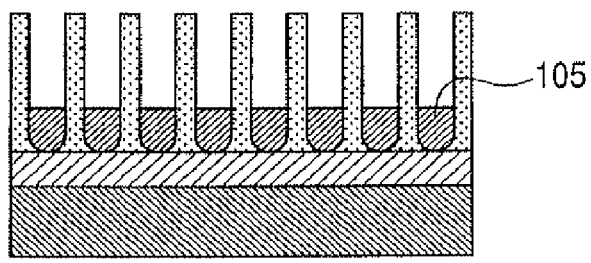
Figure 11D:
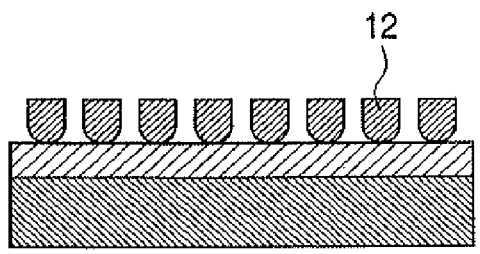

Subsequently, the layer to be anodized 102 is caused to undergo anodization within an electrolytic solution such as phosphorus acid, oxalic acid, sulfuric acid, etc. to thereby allow the layer to be anodized 102 to be a porous film 103 (see FIG. 11B). In this instance, in order to regularly arrange holes 104 of the porous film, it is sufficient to regularly dispose recessed part serving as the starting point of anodization on the surface of the layer to be anodized 102 before anodization. As the layer to be anodized 102, Al or alloy containing Al as main part may be utilized.

Further, the electrolytic solution is changed into ammonium borate, ammonium tartrate, ammonium citrate etc. to perform anodization. Thus, the second underlying layer 101 results in oxide so that the oxide 105 of the second underlying layer grows in such a manner that the oxide 105 is filled within the holes 104 of the porous film as the result of the fact that volume expansion is performed (see FIG. 11C). In order to grow the oxide 105 of the second underlying layer in this way, it is sufficient that material containing at least one element selected from Ti, Zr, Hf, Nb, Ta, Mo, W is caused to be second underlying layer 101.

Finally, the sample is immersed into acid or alkali to thereby remove, by wet etching, only the porous film 103 part. Thus, there is provided uneven structure having projections 12 including oxide of the second underlying layer corresponding to the arrangement of holes 104 of the porous film (see FIG. 11D).

EXAMPLES

First Example

This example relates to preparation of a patterned medium in which hard magnetic materials disposed on the upper surfaces of the projection are caused to serve as recording part.

Figure 3A:
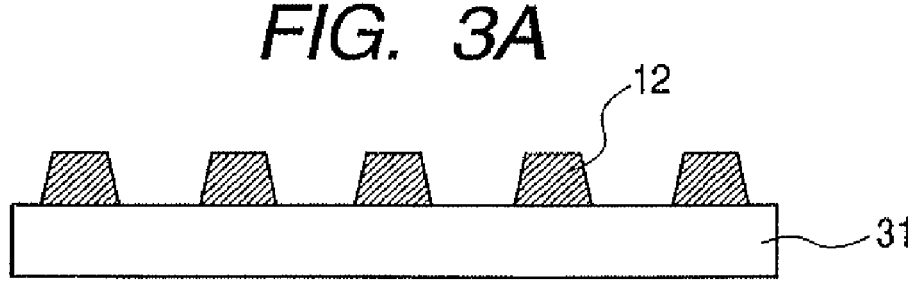
FIGS. 3A, 3B and 3C are process diagrams showing a method of manufacturing a magnetic recording medium of the first example.
Figure 3B:
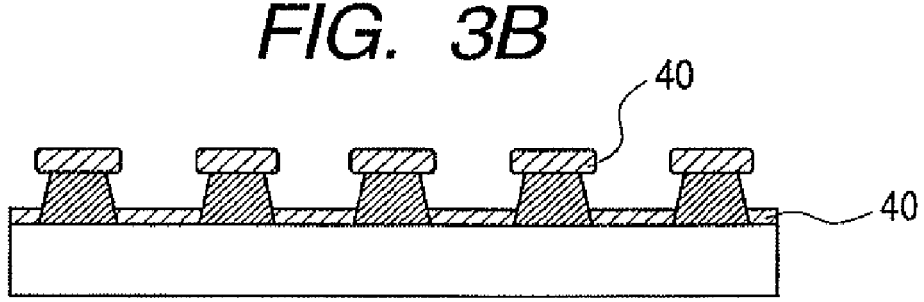
Figure 3C:
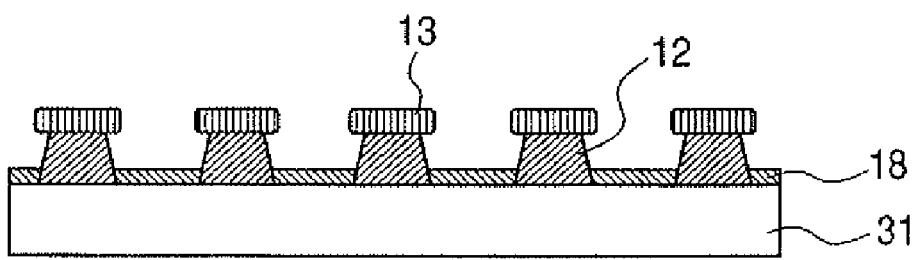

FIGS. 3A to 3C are process diagrams showing a method of manufacturing a magnetic recording medium of the first example of the present invention. A Si substrate having oxide film formed on the surface thereof is prepared to dispose photosensitive resist on the substrate surface similarly to typical semiconductor process to form resist pattern by using photomask. Thereafter, projections 12 including $SiO_2$ are regularly disposed on a Si substrate by dry etching to form uneven structure (see FIG. 3A). In this example, projections in which the surface shape is regular square having one side of 100 nm and height is 50 nm are arranged in regular square form at intervals of 160 nm.

Next, magnetic material is disposed by sputtering on the uneven structure (see FIG. 3B). In this example, FePt film is formed by sputtering so that composition ratio between Fe and Pt is 50:50 atomic %, and the film thickness becomes equal to 20 nm. In this instance, sputtering condition is set such that argon gas pressure becomes equal to 0.1 Pa and the distance between the target and the sample becomes equal to 150 mm, whereby attachment onto the side surface of the projection is suppressed. Thus, FePt is disposed as shown in FIG. 3B.

Next, annealing is performed at 500° C. in vacuum to form $L1_0$ ordered FePt and silicide. Namely, as shown in FIG. 3C, the FePt disposed on the upper surface of the projection 12 constitutes hard magnetic material 13 as the result of the fact that the crystal structure is changed from the disordered structure of fcc to $L1_0$ ordered structure by annealing.

On the other hand, since Si is diffused from the Si substrate 31 by annealing, the FePt disposed within the recessed part between projections constitutes silicide 18 including $FePtSi_x$, which does not constitute hard magnetism. As stated above, there is prepared structure in which hard magnetic materials are disposed on the upper surfaces of regularly arranged projections, and silicide is disposed within each recessed part between projections. In the structure of this example, since magnetic materials disposed within recessed parts between projections are changed into silicide so that magnetic coupling between the magnetic material disposed within the recessed part and the hard magnetic material disposed on the upper surface of the projection is broken, it becomes possible to provide a patterned medium in which hard magnetic materials disposed on the upper surfaces of the projections are caused to serve as recording part.

Second Example

This example relates to the fact that crystal orientation of hard magnetic material serving as recording part is controlled in the first example.

Figure 4A:
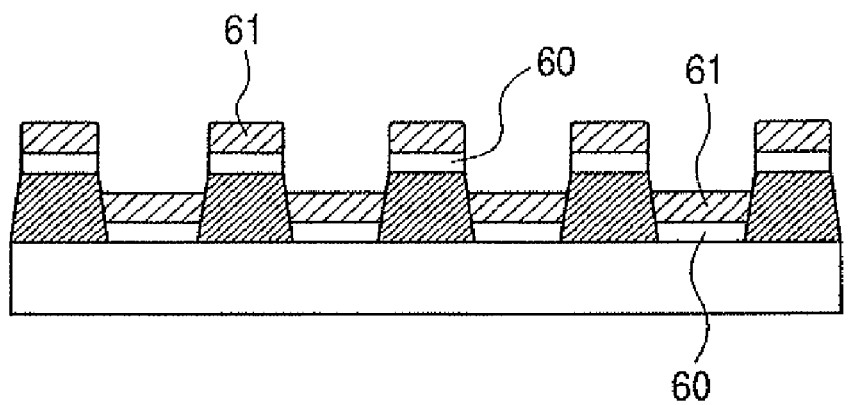
FIGS. 4A and 4B are process diagrams showing a method of manufacturing a magnetic recording medium of the second example.
Figure 4B:
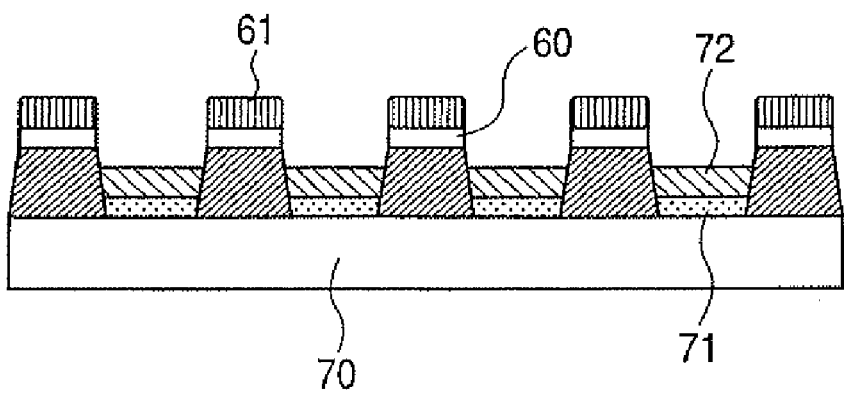

FIGS. 4A and 4B are process diagrams showing a method of manufacturing a magnetic recording medium of the second example of the present invention. Similarly to the first example, sample as shown in FIG. 3A is prepared. Further, similarly to the first example, film of magnetic material is formed while suppressing attachment onto the side surface of the project on. In this example, Pt materials are disposed on the uneven structure about 5 nm thickness thereafter to arrange magnetic material. In this example, there is provided a sample as shown in FIG. 4A such that Co 61 is disposed as magnetic material with film thickness of 20 nm on the Pt 60.

In this case, since the surface of Pt 60 has fcc structure having crystal face of (111), the Co 61 undergoes the influence of the crystal face of the Pt 60, and grows in the state where the c-axis of the hcp structure is directed toward a direction perpendicular to the substrate. Thus, there is provided hard magnetic material having uniaxial magnetic anisotropy in the direction perpendicular to the substrate.

Next, similarly to the first example, the sample is caused to undergo annealing process at: 500° C. Thus, as shown in FIG. 4B, Pt disposed within the recessed part between projections constitutes silicide including $PtSi_x$ 71 as the result of the fact that Si is diffused from the Si substrate 70. Further, the Co positioned thereabove is formed as silicide including $CoSi_x$ 72 since Si is diffused through the $PtSi_x$ 71.

On the other hand, for Pt 60 and Co 61 which are disposed on the upper surface of projection, crystallinity is improved by annealing, but there is no diffusion of Si from the substrate 70. Thus, no silicide is formed.

As stated above, similarly to the first example, there is prepared a structure in which hard magnetic materials are disposed on the upper surfaces of regularly arranged projections and silicide is disposed within each recessed part between projections. Further, the hard magnetic material of this example is disposed in the state where the c-axis of the hcp structure is directed toward the perpendicular direction, and has strong magnetic anisotropy in a direction perpendicular to the substrate. Thus, such structure is permitted to be patterned medium of the perpendicular recording system.

Third Example

This example relates to the fact that regularly arranged projections of oxide described in the first and second examples are formed by anodization.

Ti serving as the second underlying layer is formed as film on a Si substrate so that its film thickness is equal to 5 nm, and AlTi containing Ti of 10 atomic % serving as film to be anodized is further formed as film on the Ti layer by sputtering so that its film thickness becomes equal to 100 nm. Thus, sample is prepared.

Next, aluminum alkoxide is coated on the sample surface by the spin-coat process so that its thickness becomes equal to 20 nm. Subsequently, the sample is baked for 20 minutes at 90° C. thereafter to transfer recessed part serving as starting point: of anodization on the alkoxide surface by nano in-print. In this example, mold in which projections having height of 15 nm are arranged in triangular lattice form at intervals of 50 nm is pressed onto the alkoxide surface to thereby transfer the projections of the mold onto the alkoxide surface as recessed part serving as starting point of anodization.

Further, the sample is processed for 10 minutes by ashing using ultraviolet rays and ozone at 180° C. thus to remove polymer part within alkoxide, and to develop, at the same time, oxidation of aluminum part to oxidize the alkoxide layer.

Thereafter, anodization is performed at an applied voltage of 20 V within 0.3 mol/L sulfuric acid aqueous solution at bath temperature of 16° C. The alkoxide layer and the aluminum-titanium alloy layer which have been oxidized are collectively anodized. Thus, there is formed a porous film arranged in triangular lattice form similarly to the pattern of projections of mold.

Next, the porous film thus obtained is immersed for 20 minutes within 5 wt % phosphoric acid aqueous solution at bath temperature of 22° C. to thereby enlarge hole diameter by wet etching. Thus, 20 nm of the hole diameter is enlarged into 35 nm.

Next, the sample is caused to undergo anodization at an applied voltage of 40 V within 0.15 mol/L ammonium borate aqueous solution at bath temperature of 22° C. Thus, the second underlying layer is changed into oxide, and oxide of Ti serving as oxide of the second underlying layer grows in such a manner that the oxide of Ti is filled within holes of the porous film. In this instance, the height of oxide of Ti which has been grown by the anodization within ammonium borate aqueous solution is determined by anodization voltage, and is 50 nm in this example.

Further, the surface of the sample is polished by diamond slurry to simultaneously polish porous film and oxide of Ti so that the height of oxide of Ti is caused to be 40 nm. In this state, the sample is immersed for 5 minutes within NaOH aqueous solution of 0.1 mol/L at bath temperature of 23° C. to thereby remove the porous film. Thus, there is provided an uneven structure in which oxides of Ti serving as oxide of a second underlying layer 81 are left on a Si substrate 80 as projections 82 having height of 40 nm and diameter of 35 nm, which are arranged in a triangular form at intervals of 50 nm (see FIG. 5).

Figure 5:
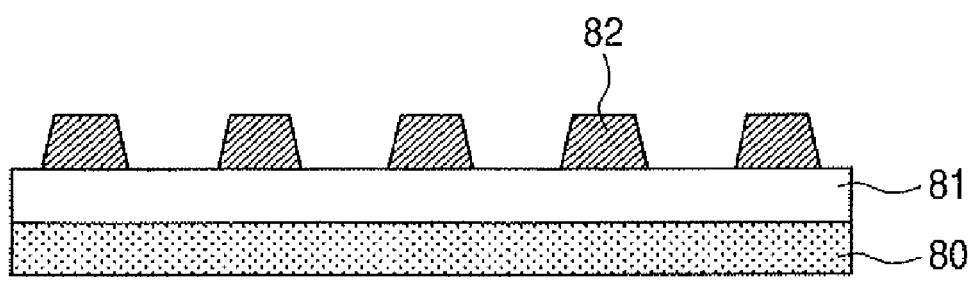
FIG. 5 is a view showing, in a model form, uneven structure formed by the anodization of the third example.

As stated above, projections of regularly arranged oxides can be formed by the anodization. The sample of FIG. 5 is used to perform arrangement and annealing of magnetic material similarly to the first or second example so that there is prepared a structure in which hard magnetic materials are arranged on the upper surface of the regularly arranged projections, and silicide is disposed within each recessed part between projections. Thus, such structure is permitted to be patterned medium.

Fourth Example

This example relates to preparation of patterned medium in which hard magnetic material disposed on the upper surface of the projection is caused to be recording part.

Figure 6A:
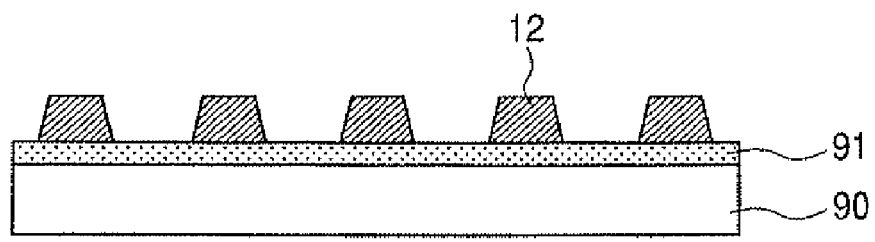
FIGS. 6A, 6B and 6C are process diagrams showing a method of manufacturing a magnetic recording medium of the fourth example.

A quartz substrate 90 is prepared to form, as film, an Al layer 91 on the substrate by sputtering so that film thickness is equal to 5 nm, and to further form, as film, an $SiO_2$ layer on the Al layer by sputtering so that film thickness is equal to 50 nm so that those layers are disposed. Similarly to the first example, resist pattern is formed on the surface of the $SiO_2$ layer thereafter to perform dry etching to thereby perform patterning of the $SiO_2$ layer to form an uneven structure by the projection 12 including $SiO_2$ on the Al layer 91 (see FIG. 6A). In this example, projections in which the surface shape is regular square having one side of 100 nm and height is 50 nm are arranged in a regular square form at intervals of 160 nm.

Figure 6B:
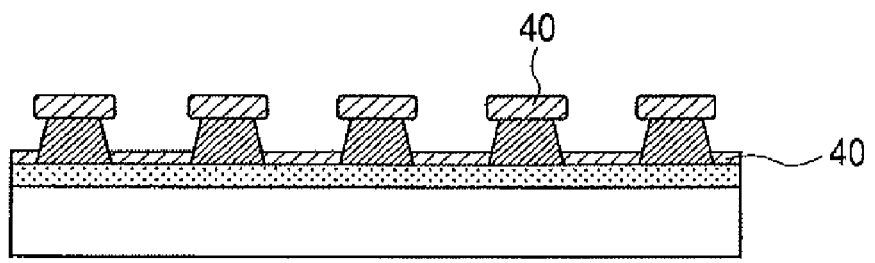

Next, under the same condition as the first example, FePt is disposed on the uneven structure by sputtering (see FIG. 6B).

Figure 6C:
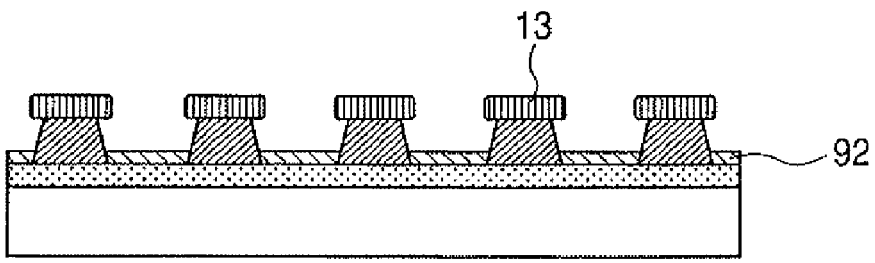

Next, annealing is performed at 500° C. in vacuum to change, as shown in FIG. 6C, the FePt disposed on the upper surface of the projection 12 from the disordered structure of fcc to the $L1_0$ ordered structure to change it into hard magnetic material 13. In this case, since the FePt disposed within the recessed part between projections constitutes $FePtAl_x$ 92 since compound is formed at the interface with the Al layer by annealing, and does not constitutes hard magnetism without being changed into the $L1_0$ ordered structure.

As stated above, there is prepared a structure in which hard magnetic materials are disposed on the upper surfaces of regularly arranged projections, and compound of FePt and Al layer is disposed within each recessed part between projections. In the structure of this example, only magnetic materials disposed on the projection upper surfaces are caused to be hard magnetic material by heat treatment, thereby making it possible to separate magnetic coupling between the magnetic material disposed on the projection and the magnetic material disposed within the recessed part between the projections. Thus, such structure is permitted to be patterned medium in which hard magnetic material disposed on the upper surface of the projection is caused to be recording part.

While, in this example, Al layer is used as an underlying layer to form, by heat treatment, compound of FePt and Al which are disposed within the recessed part of the projection, it should be noted that the present invention is not limited to this example.

Namely, since it is only required that magnetic material disposed within the recessed part of the projection forms compound which contains the material of the underlying layer by heat treatment, and change of composition takes place so that non-magnetic property or soft magnetic property is exhibited, similar advantages can be obtained also in the case where Ge layer or Mg layer is used in place of the Al layer.

Fifth Example

This example relates to preparation of a patterned medium in which hard magnetic materials disposed on the upper surfaces of the projection are caused to be recording parts.

Nb serving as the second underlying layer is formed, as film, on a quartz substrate by sputtering so that its film thickness becomes equal to 15 nm, and AlTi containing Ti of 10 atomic % serving as film to be anodized is further formed, as film, on the Nb layer so that the film thickness becomes equal to 100 nm thus to prepare a sample.

Next, similarly to the third embodiment, a porous film in which holes are regularly arranged is prepared by anodization to grow oxide of Nb serving as oxide of the second underlying layer within holes of porous film so that its height becomes equal to 50 nm.

Figure 10A:
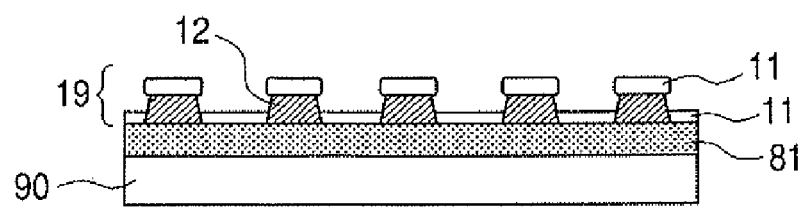
FIGS. 10A, 10B, 10C and 10D are process diagrams showing a method of manufacturing a magnetic recording medium of the fifth example.
Figure 10B:
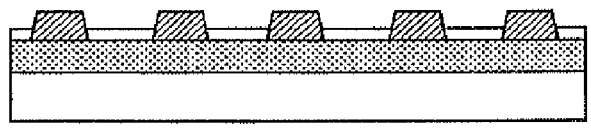

Next, the sample is immersed for five minutes within NaOH aqueous solution of 0.1 mol/L at bath temperature of 23° C. Thus, there is provided uneven structure 19 including projections 12 which consist of the oxide of Nb having height of 50 nm and the second underlying layer 81 on a quartz substrate 90. Thereafter, the silicon layer 11 serving as the underlying Layer is formed as film by sputtering so that film thickness becomes equal to 10 nm (see FIG. 10A). Further, the surface of the sample is polished by diamond slurry to thereby remove the silicon layer disposed on the upper surface of the projection, and to perform, at the same time, surface polishing of the projection so that the height becomes equal to 40 nm (see FIG. 10B).

Figure 10C:
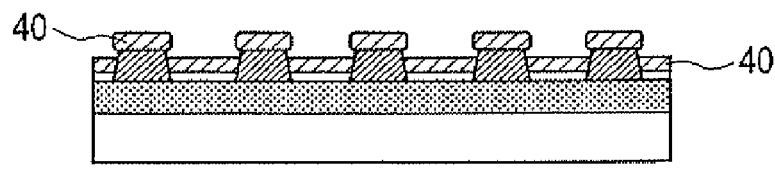

Next, similarly to the first embodiment, FePt 40 is disposed on the uneven structure by sputtering so that its film thickness becomes equal to 10 nm (see FIG. 10C).

Figure 10D:
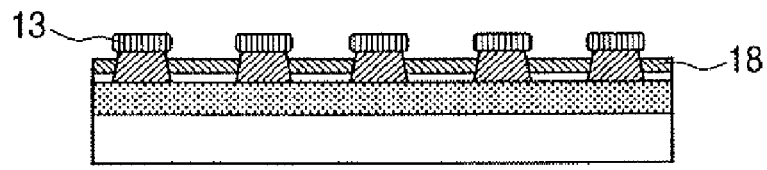

Next, annealing is performed at 500° C. in vacuum to thereby change the FePt disposed on the upper surface of the projection 12 from the disordered structure of fcc to $L1_0$ ordered structure as shown in FIG. 10D to allow it to be hard magnetic material 13. In this case, since compound is formed at the interface with the silicon layer by annealing, the FePt disposed within the recessed part between projections constitutes silicide 18 including $FePtSi_x$, and not changed into the $L1_0$ ordered structure so that it does not exhibit hard magnetism.

As stated above, there is prepared a structure in which hard magnetic materials are disposed on the upper surfaces of the regularly arranged projections and compound of FePt and silicon layer is disposed within each recessed part between projections. Thus, such a structure is permitted to be a patterned medium in which hard magnetic material disposed on the upper surface of the projection is caused to be recording part.

In the present invention, only the magnetic material within each recessed part of the uneven structure is locally non-magnetized or soft-magnetized, thereby making it possible to provide a magnetic recording medium having high recording density by simple manufacturing method. The present invention can be utilized in information storage field by magnetic recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-256319, filed Sep. 21, 2006, and No. 2007-004971, filed Jan. 12, 2007, and No. 2007-176692, filed Jul. 4, 2007, which are hereby incorporated by reference herein in their entirety.

What is claimed is:

1. A method of manufacturing a magnetic recording medium, comprising the steps of:
   disposing a first underlying layer on a substrate;
   disposing a second underlying layer on the first underlying layer;

disposing a layer to be anodized on the second underlying layer;

anodizing the layer to be anodized to change the layer into a porous film having regularly arranged holes;

forming projections by growing an oxide of a material of the second underlying layer within the holes of the porous film in a manner perpendicular to the substrate;

removing the porous film to obtain an uneven structure with the projections comprising the oxide of the material of the second underlying layer;

disposing a magnetic material on each upper surface of the projections and within recessed parts of the uneven structure; and heat treating the magnetic material disposed within the recessed parts to change the magnetic material into a compound containing the material of the first underlying layer.

2. The method of manufacturing a magnetic recording medium according to claim 1, wherein the step of forming projections comprising anodizing the second underlying layer.

3. The method of manufacturing a magnetic recording medium according to claim 2, wherein the second underlying layer is anodized by using an electrolyte solution which is an aqueous solution of ammonium borate, ammonium tartrate or ammonium citrate.

* * * * *